United States Patent [19]

Nomura

[11] Patent Number: 4,615,561
[45] Date of Patent: Oct. 7, 1986

[54] VEHICLE SEAT
[75] Inventor: Kaoru Nomura, Asaka, Japan
[73] Assignee: Honda Giken Kogyo Kabushiki Kaisha, Tokyo, Japan
[21] Appl. No.: 609,952
[22] Filed: May 14, 1984
[30] Foreign Application Priority Data May 12, 1983 [JP] Japan .............................. 58-70982 [U]
May 13, 1983 [JP] Japan .............................. 58-71182 [U]

[51] Int. Cl.$^4$ ............................................ A47C 15/00
[52] U.S. Cl. .................................. 297/243; 297/452; 297/460
[58] Field of Search ............... 297/243, 180, 453, 452, 297/423, 353, 464, 460; 296/64

[56] References Cited

U.S. PATENT DOCUMENTS

| | | |
|---|---|---|
| 3,331,089 | 7/1967 | Ornas, Jr. et al. .................. 297/453 |
| 3,377,103 | 4/1968 | Borton et al. ....................... 297/180 |
| 3,695,689 | 10/1972 | Barecki ................................ 297/243 |
| 3,770,318 | 11/1973 | Fenton ................................. 297/180 |
| 3,924,893 | 12/1975 | Ferrara ................................ 297/460 |

FOREIGN PATENT DOCUMENTS 2651843 5/1978 Fed. Rep. of Germany ...... 297/460
1552382 11/1968 France ................................ 297/460

Primary Examiner—James T. McCall
Attorney, Agent, or Firm—Armstrong, Nikaido, Marmelstein & Kubovcik

[57] ABSTRACT

A vehicle seat is provided which comprises a seat cushion, a seat back and a side support fixed to each side of the seat back. Each of the side supports has a recess formed in the rear thereof to allow space for the knees of a passenger sitting in a rear seat behind the vehicle seat of the present invention. Further, a gap may be formed between the side surface of the middle portion of the seat back and the middle portion of the side support and at least one groove may be formed in the seat back. The groove opens into the gap so that air in the interior of the vehicle may flow through the groove by way of the gap thereby cooling the back of the passenger sitting in the seat.

5 Claims, 6 Drawing Figures

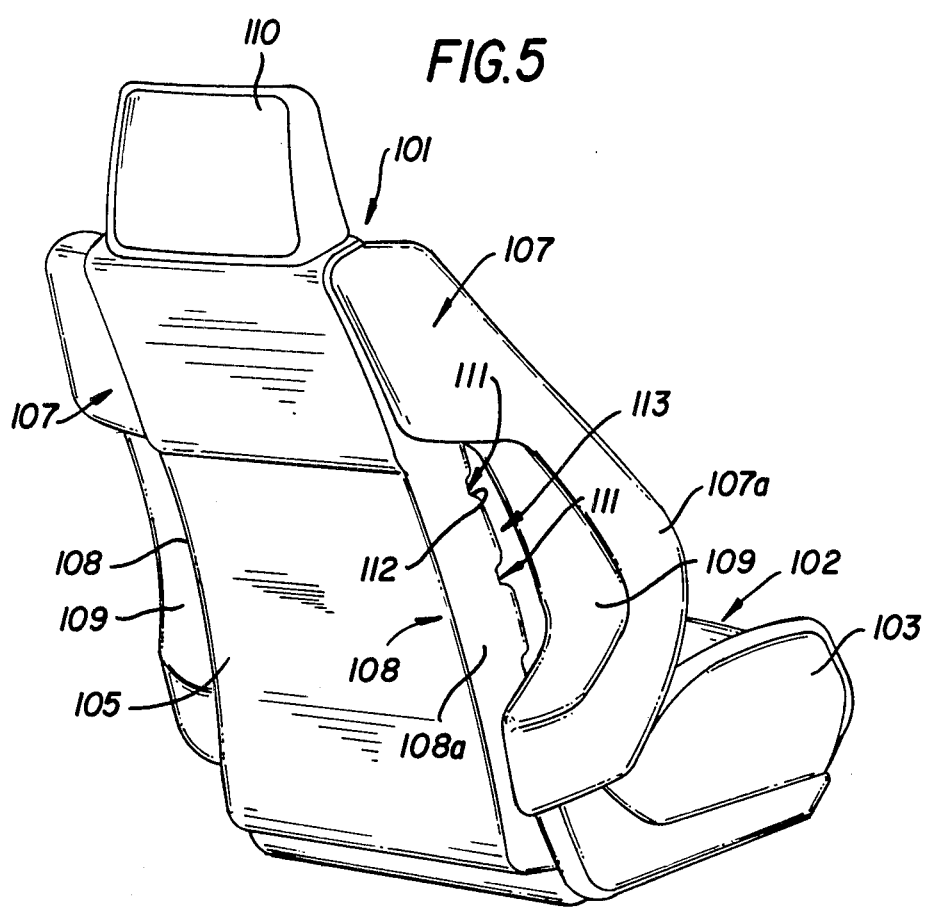

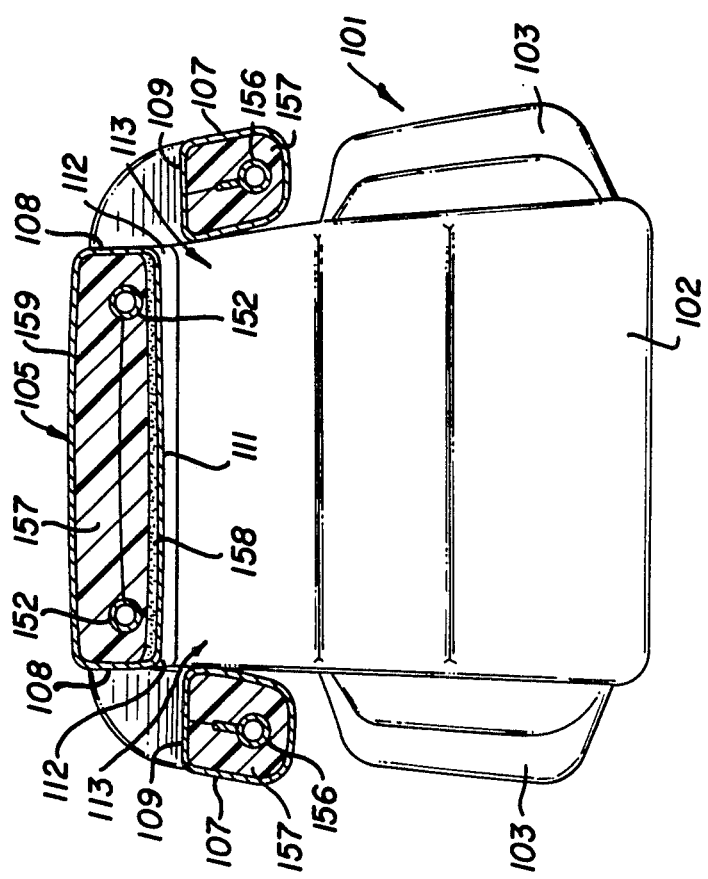

VEHICLE SEAT

BACKGROUND OF THE INVENTION

The present invention is directed to a passenger seat for a vehicle and, more particularly, to a passenger seat for a vehicle in which the seat back portion is equipped with side supports on both sides, the side supports having recessed portions therein to accommodate the knees of a passenger sitting in a seat behind the passenger seat of the present invention. Further, the present invention is directed to a passenger seat for a vehicle which includes grooves in the seat back portion of the seat, wherein the grooves permit airflow therethrough to enhance the comfort of the passenger sitting in the seat.

DESCRIPTION OF THE PRIOR ART

In general, prior art vehicle seats for accommodating a single passenger or driver are of the type having separate seat cushion and seat back portions with a reclining mechanism for enabling the seat back to be adjusted to various angles of inclination. Furthermore, the seat may be moved back and forth on the vehicle floor. Generally, a rear seat is disposed behind the seat of the type just described. When the front seat is moved backwards, the gap between the front and rear seats is narrowed, thereby reducing the space for the knees of the passenger in the rear seat, so that the passenger in the rear seat feels cramped. This problem is particularly troublesome in small-sized vehicles. In order to have sufficient space for his knees, the passenger in the rear seat will generally place his knees at the sides of the seat back of the front seat. If, however, the seat is of a type having a wide seat back, for example, one equipped with side supports at both sides of the seat back portions, the knees of the passenger in the rear seat will contact the side supports even if his knees are separated, thereby giving the passenger in the rear seat a cramped feeling.

Further, in vehicles equipped with a heating or cooling apparatus such as an air conditioner, air from the apparatus can contact the front of a passenger to effect cooling. However, when the passenger is seated, his back is generally in close contact with the seat back so that there is substantially no air flow to the passenger's back. This lack of air flow can result in sweating, thereby making the individual uncomfortable.

In one prior art attempt to solve this problem, a separate back cushion made in an open construction, such as with rattan, is positioned between the seat back portion and the passenger's back. The separate back cushion, however, reduces the size of the seat, thereby causing discomfort to the passenger. Furthermore, a back cushion made of rattan is hard, which also makes it uncomfortable when used.

Another prior art technique for solving the ventilation problem is described in Japanese Utility Model Publication No. 47-35055 in which the seat has a double-layered surface formed with crossing grooves and a blower. This approach for solving the problem, however, has the disadvantage that the seat requires a special surface cover which is complicated and, furthermore, it requires a blower.

SUMMARY OF THE INVENTION

It is the primary object of the present invention to provide a vehicle seat in which the seat back portion has side supports, the side supports having recesses therein to accommodate the knees of a passenger riding in a rear seat positioned behind the vehicle seat of the present invention.

It is another primary object of the present invention to provide a vehicle seat having a seat back portion with side supports in which the seat back portion has grooves therein for permitting airflow therethrough.

The present invention is directed to a vehicle seat which comprises a seat cushion, a seat back and side support means fixed to each side of the seat back. Each of these side support means has a recess formed in the rear thereof, so that a passenger sitting in a rear seat behind the vehicle seat of the present invention can place his knees in the recesses. In one embodiment of the present invention, the support means contacts the seat back over the entire length of the support means. In an alternative embodiment, the seat back includes at least one groove extending thereacross, and a gap is formed between the side surface of the middle portion of the seat back and the support means with the at least one groove opening into the gap. The groove and gap permits airflow therethrough when the vehicle seat is occupied, thereby giving comfort to a passenger occupying the seat.

BRIEF DESCRIPTION OF THE DRAWINGS

FIG. 5 is a rear perspective view of the embodiment of FIG. 4.

FIG. 6 is a top sectional view of the embodiment of FIG. 4.

DETAILED DESCRIPTION OF THE PREFERRED EMBODIMENTS

Figure 1:
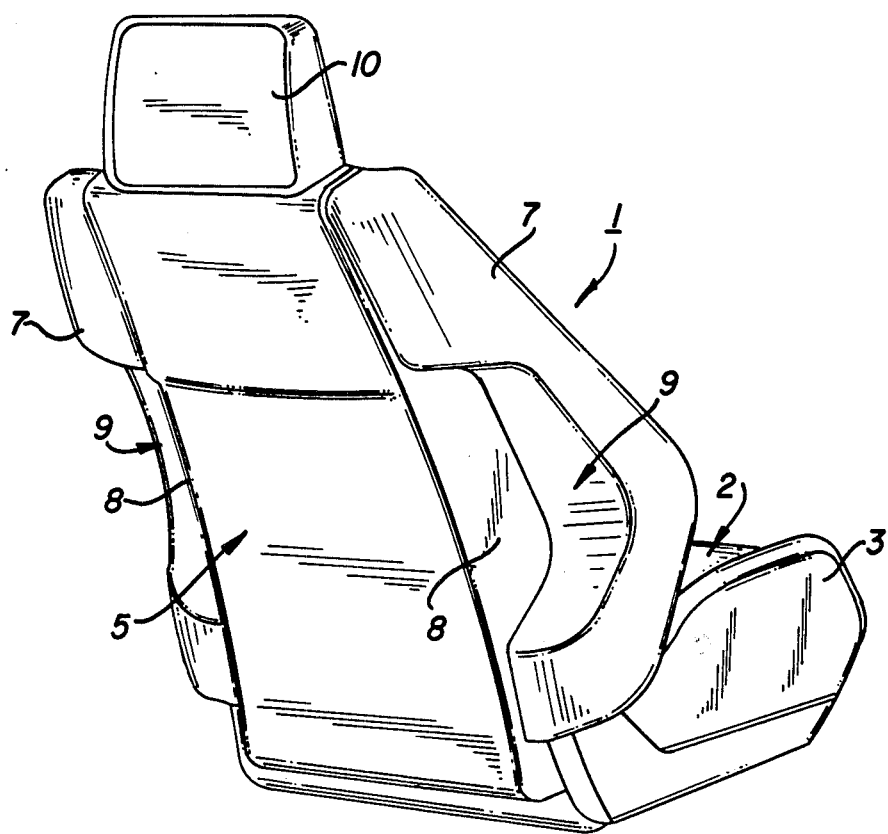
FIG. 1 is a rear perspective view of a vehicle seat of the present invention.
Figure 2:
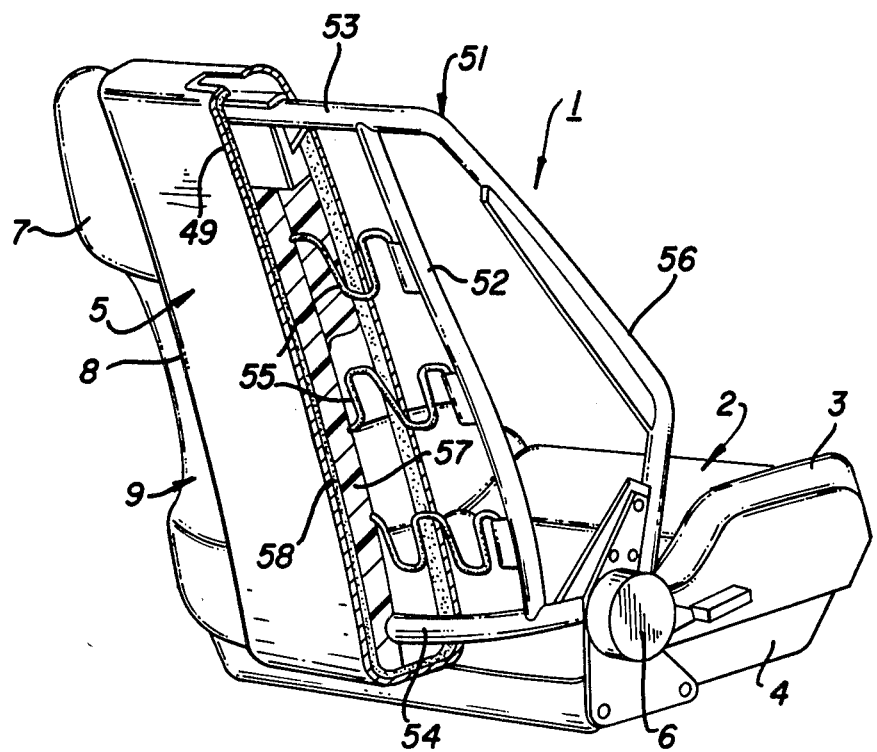
FIG. 2 is a partial cut-away rear perspective view thereof.
Figure 3:
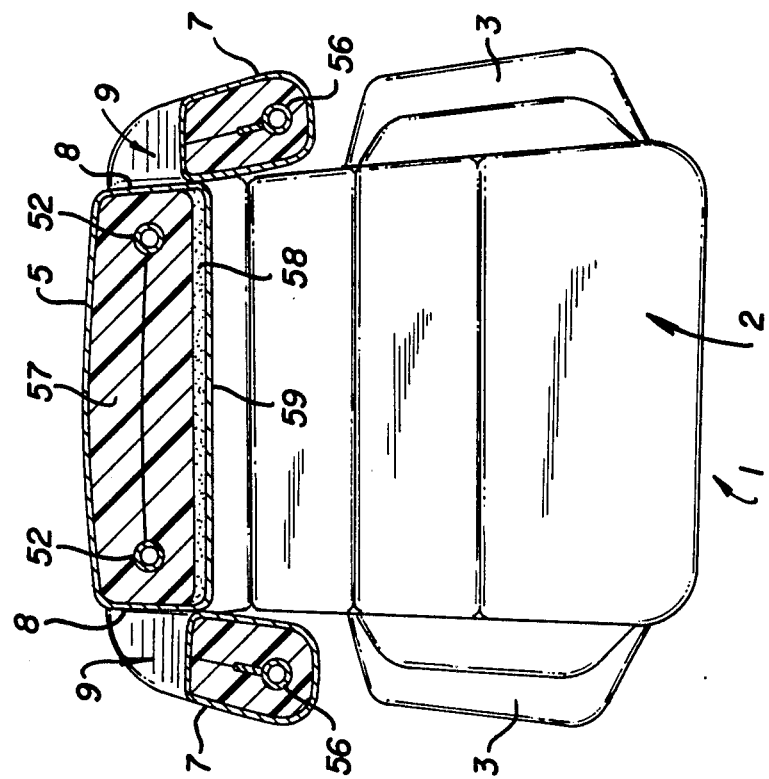
FIG. 3 is a top sectional view thereof.

Referring to the embodiment shown in FIGS. 1-3, a seat 1 comprises a seat cushion 2 and a seat back 4. The seat cushion 2 has right and left side supports 3 for supporting the thighs of a passenger. A frame 4 made of steel plates or the like is movable back and forth on the floor of the vehicle so that the position of the front seat 1 can be adjusted on the floor.

The seat back 5 extends from the rear end portion of the seat cushion 2 and can be inclined at an adjusted angle by means of a reclining mechanism 6. The seat back 5 is equipped with a frame 51 made of a pipe material in which longitudinal tubes 52 extend between upper and lower transverse tubes 53 and 54. A plurality of cushion springs 55 are vertically spaced from one another and are positioned between right and left tubes 52. Side support frames 56, which are integral with the longitudinal tubes 52 are positioned outside of the tube 52 and extend forward.

The frame 51 is covered with a base material 57 having a certain rigidity, e.g., urethane, which is covered with an intermediate material 58 made of a cushioning material, e.g., sponge, which is covered with a surface cover 59, thus forming the seat back 5. The seat cushion 2 has a similar construction.

Side supports 7 extend outward and forward from the side portions 8 of the seat back 5. The supports 7 have frames comprising frames 56 which are formed by extending the sides of the seat back frame 51 sideways and forward. The frames 56 are covered with a base material 57 and intermediate material 58 and a surface cover 59.

Forwardly recessed portions 9 are formed at the vertically middle or lower portions of the side supports 7. The recesses 9 are formed by removing portions of the backs of the side portions 7. A head rest 10 may be positioned on the top of the seat back 5.

In operation, a passenger seated in seat 1 has his shoulders and arms supported by the side supports 7 which are disposed on both sides of the seat back 5 of the front seat 1. The side supports 7 at both the right and left sides of the back seat 5 are formed with forward recesses 9 for accommodating the knees of a passenger in a rear seat. As a result, the passenger in the rear seat can be seated in a comfortable position even if he is a large person. Thus, while insuring and improving the holdability and comfort of a passenger in the front seat, a passenger in the rear seat can be free from being cramped, and can thus be comfortably seated in a rear seat. Moreover, the rearward movement of the front seat can be extended to improve the comfort of the passenger in the front seat.

Figure 4:
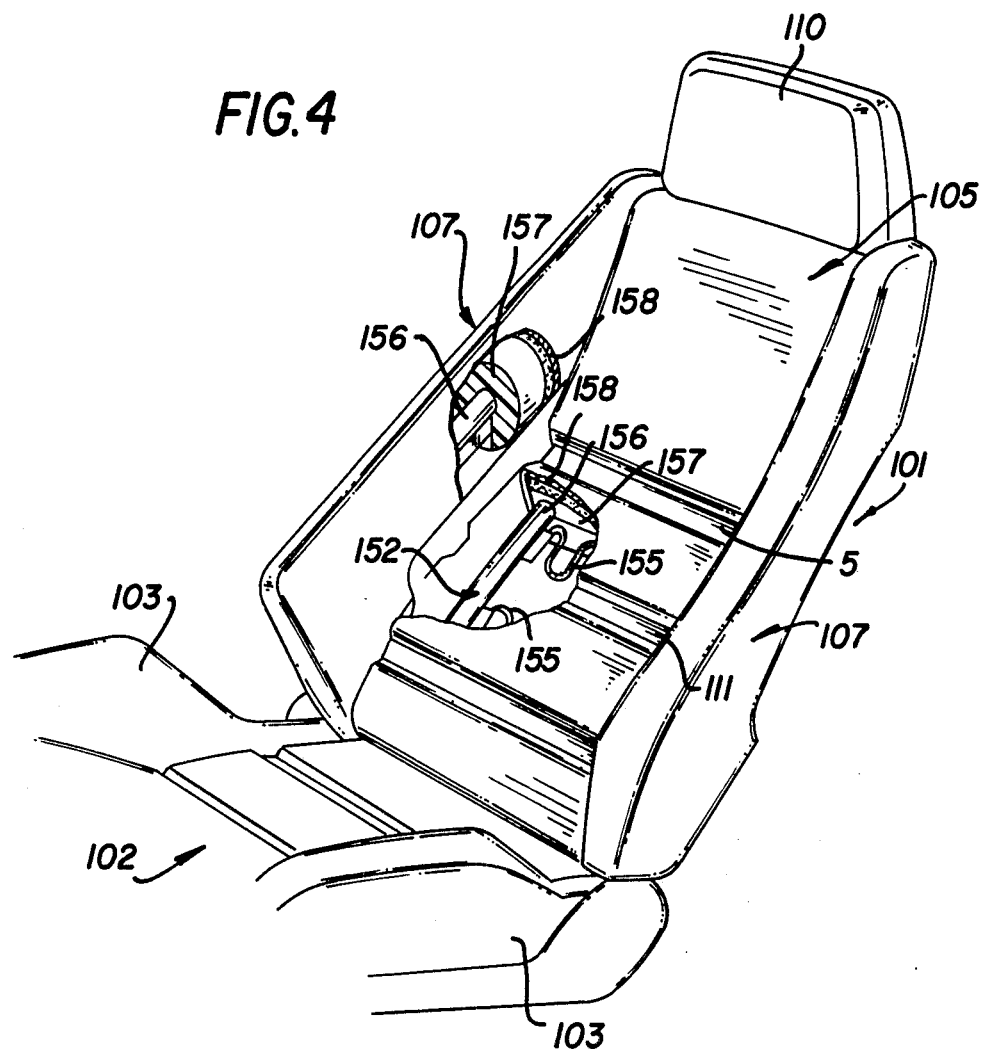
FIG. 4 is a front partial cut-away sectional view of an alternate embodiment of the vehicle seat of the present invention.

In the second embodiment shown in FIGS. 4, 5 and 6, a seat 101 comprises a seat cushion 102 and seat back 105. The seat back 105 can be inclined at an adjusted angle with respect to the seat cushion 102 by means of a reclining mechanism (not shown). In this embodiment, the seat cushion 102 has side supports 103 for supporting the thighs of a passenger. Seat back 105 has a U-shaped frame which is formed by bending a pipe material, one longitudinal side of which 152 is shown in FIG. 1. Transverse springs 155 are mounted between the longitudinal tubes 152 of the frame and are vertically spaced from one another. The frame and the springs are covered with a base material 157 having some rigidity, e.g., urethane. This base material 157 is covered at its front side with a soft intermediate material 158, e.g., sponge. The base and intermediate materials 157 and 158 are further covered with a surface cover 159. A head rest 110 is placed on the seat back 105.

The seat back 105 is formed at its front middle portion to contact the back of the passenger, except for grooves 111 which have their side ends opened. The grooves 111 extend across the entire width of the back seat 105 and are recessed deep enough so that even if the surface cover 159 is deformed by the back of the passenger, the grooves 111 remain. Seat back 105 has side supports 107 for supporting the shoulders and arms of a passenger. The side supports 107 comprise frames 156 which are formed of pipe material fixed to the sides of the seat back 105. A base material 157 of urethane covers the frames 156 and an intermediate material 158 and a surface cover 159 cover the base material 157. The side supports 107 protrude forward from both of the sides of the seat back 105.

The side supports 107 have recessed portions 109 formed at their vertical mid portions. The middle portions 107a of the side supports 107 and the middle portions 108 of the seat back sides 108 do not contact each other due to the formation of the recesses 109. A gap 113 is formed between the recess 109 and the side surface and edges of the middle portions 108a of the seat back 105. The grooves 112 extend to the gaps 113. The grooves 111 are always open to the vehicle interior through the gaps 113 on each side of the seat back 105.

When a passenger is seated on the seat cushion 102 of the seat 101 with his back contacting the surface of the seat back 105, the seat back 105 has the grooves 111 formed therein, which extend across the seat. Both sides of the grooves 111 communicate through the gaps 113 with the vehicle compartment. As a result, chilled air supplied into the compartment by an air conditioner, for example, flows through the gaps 113 into the open ends 112 of the grooves 111 and then through the grooves 111. Thus, the ventilation of the cool air at the portions corresponding to the grooves of the seat back is ensured, so that cooling of the passenger's back by the ventilation can be effected even if the passenger's back is in contact with the seat cushion 105.

Thus, it is possible to provide a comfortable seat which holds the passenger in the seat in a stable position and also effects the cooling of the back of the passenger while preventing the passenger from sweating the feeling uncomfortable.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A vehicle seat comprising a seat cushion, a seat back, and separate side support means fixed to each side of said seat back, each of said side support means having a leg receiving recess formed in the rear thereof, said recess extending in the rear to front direction.

2. In a vehicle seat comprising a seat cushion, a seat back, and side support means fixed to each side of said seat back, the improvement comprising a leg receiving recess formed in the rear of each of said side support means, said recess extending in the rear to front direction and being adapted to provide space for the knees of a passenger seated in a seat behind said vehicle seat, and wherein each of said side support means is separate from said seat back.

3. A vehicle seat as set forth in claim 1 or 2 wherein said seat back includes at least one groove extending thereacross and wherein a gap is formed between the side surface of the middle portion of said seat back and said support means, said at least one groove opening into said gap.

4. A vehicle seat as set forth in claim 3 wherein said at least one groove is a plurality of grooves.

5. A vehicle seat as set forth in claim 1 or claim 2 wherein at least the front edge of said side support means extends in the forward direction beyond the front edge of said seat back.

* * * * *